(12) United States Patent
Nishikawa et al.

(10) Patent No.: US 6,453,762 B1
(45) Date of Patent: Sep. 24, 2002

(54) CHANGE DEVICE OF TRANSMISSION FOR VEHICLE

(75) Inventors: Yutaka Nishikawa; Atsuo Ota; Yuichi Tawarada, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 41 days.

(21) Appl. No.: 09/692,181

(22) Filed: Oct. 20, 2000

(30) Foreign Application Priority Data

Oct. 22, 1999 (JP) ............................. 11-301305

(51) Int. Cl.$^7$ .................. F16H 59/00; F16H 61/00; F16H 63/00
(52) U.S. Cl. .................. 74/335; 477/79; 701/52; 74/336 R
(58) Field of Search ............... 74/335, 336 R; 477/79, 81, 86; 192/3.58, 3.63; 701/52, 67

(56) References Cited

U.S. PATENT DOCUMENTS 5,096,031 A  * 3/1992 Cortesi ................ 192/3.58
6,073,507 A  * 6/2000 Ota et al. .............. 72/335

FOREIGN PATENT DOCUMENTS

| JP | 61309357 | * 7/1988 | ................ 180/234 |
| JP | A1182734 | 3/1999 | |

* cited by examiner

Primary Examiner—Sherry Estremsky
Assistant Examiner—Tisha D. Lewis
(74) Attorney, Agent, or Firm—Birch, Stewart, Kolasch & Birch, LLP (57) ABSTRACT

To enable a change spindle to be always operated as a driver wishes by providing an alternative selection of a motor change mode and a manual change mode. A change motor and a change manipulating member are arranged such that they can be connected to a change spindle of a transmission in parallel. Mode changeover means which can be changed over between a motor change mode position (A) which enables the operation of the change spindle only by the change motor and a manual change mode position (B) which enables the operation of the change spindle only by the change manipulating member is disposed between the change spindle and the change motor and the change manipulating member.

18 Claims, 9 Drawing Sheets

CHANGE DEVICE OF TRANSMISSION FOR VEHICLE

BACKGROUND OF THE INVENTION

1. Field of the Invention

The present invention relates to a change device for a transmission for a vehicle, mainly a motorcycle, and particularly to an improvement of the change device which provides a change motor and a change manipulating member such that they are connectable to a change spindle of the transmission in parallel so that the change spindle is operable by either the change motor or the change manipulating member.

2. Description of Background Art

A change device for a transmission for a vehicle is disclosed in Japanese Laid-open Patent Publication 82734/1999. This change device of a transmission can freely change the change mode corresponding to the preference of a driver or a driving condition.

However, with respect to the conventional change device of a transmission, a change motor and a change manipulating member are always connected to a change spindle in a parallel condition. Accordingly, in the case where the change motor and the change manipulating member are simultaneously manipulated because of an erroneous manipulation, particularly, in the case where the rotational directions which are given to the change spindle by the change motor and the change manipulating member are opposite to each other, it gives rise to a mutual interference in torque.

SUMMARY AND OBJECTS OF THE INVENTION

The present invention has been made in view of the above and it is an object of the present invention to provide the change device of a transmission for a vehicle which allows the change spindle to be always operated as a driver wishes by enabling an alternative selection of a motor change mode which provides an operation of the change spindle by the change motor and a manual change mode which provides the operation of the change spindle by the change manipulating member.

To achieve the above-mentioned object, according to the present invention, in a change device of a transmission for a vehicle in which a change motor and a change manipulating member are provided such that they can be connected to a change spindle of a transmission device in parallel whereby said change spindle can be operated by either the change motor or the change manipulating member, the first feature lies in that mode changeover means which is capable of performing a changeover operation between a motor change mode position which provides an operation of the change spindle only by the change motor and a manual change mode position which provides an operation of the change spindle only by the change manipulating member is disposed between the change spindle and the change motor and the change manipulating member.

The change manipulating member corresponds to a change pedal 70 in an embodiment of the present invention described later.

According to this first feature, since the motor change mode and the manual change mode can be selected by the changeover manipulation of the mode changeover means, the change mode can be freely changed corresponding to the preference of a driver or a driving condition. Further, when one change mode is selected, the other change mode becomes inoperable so that the operational interference between the change motor and the change pedal can be obviated in advance whereby the change spindle is always rotated as the driver wishes thus realizing an appropriate transmission.

In addition to the above-mentioned feature, the present invention has a second feature wherein a rotor shaft of the change motor is connected to the change spindle by way of a clutch member. A connecting portion which is connectable with the change manipulating member is provided to one end of the change spindle. A connection constraining member which is movable between a constraint position which prevents the connection of the change manipulating member to the connecting portion and a unconstraint position which allows the connection of the change manipulating member to the connecting portion is provided. The operation of clutch means and the operation of the connection constraining member are interlocked such that when the clutch means is connected, the connection constraining member occupies the constraint position and when the clutch means is interrupted, the connection constraining member is allowed to move to the unconstraint position.

The connection constraining member and the connecting portion of the change spindle respectively correspond to a connection constraining cover 51 and a serration connecting portion 11a in the embodiment of the present invention described later.

According to this second feature, when the mode changeover means is shifted to the motor change mode position, the change manipulating member is forced to be removed from the change spindle so that the operation of the change spindle by the change manipulating member becomes inoperable and an appearance is enhanced.

Further, in addition to the first and second features, the present invention has a third feature that the mode changeover means is disposed at a place where a driver cannot manipulate the mode changeover means in a driving posture. According to this third feature, a careless changeover of the changeover means during cruising can be obviated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A mode for carrying out the invention is explained hereinafter based on one embodiment shown in attached drawings.

Figure 1:
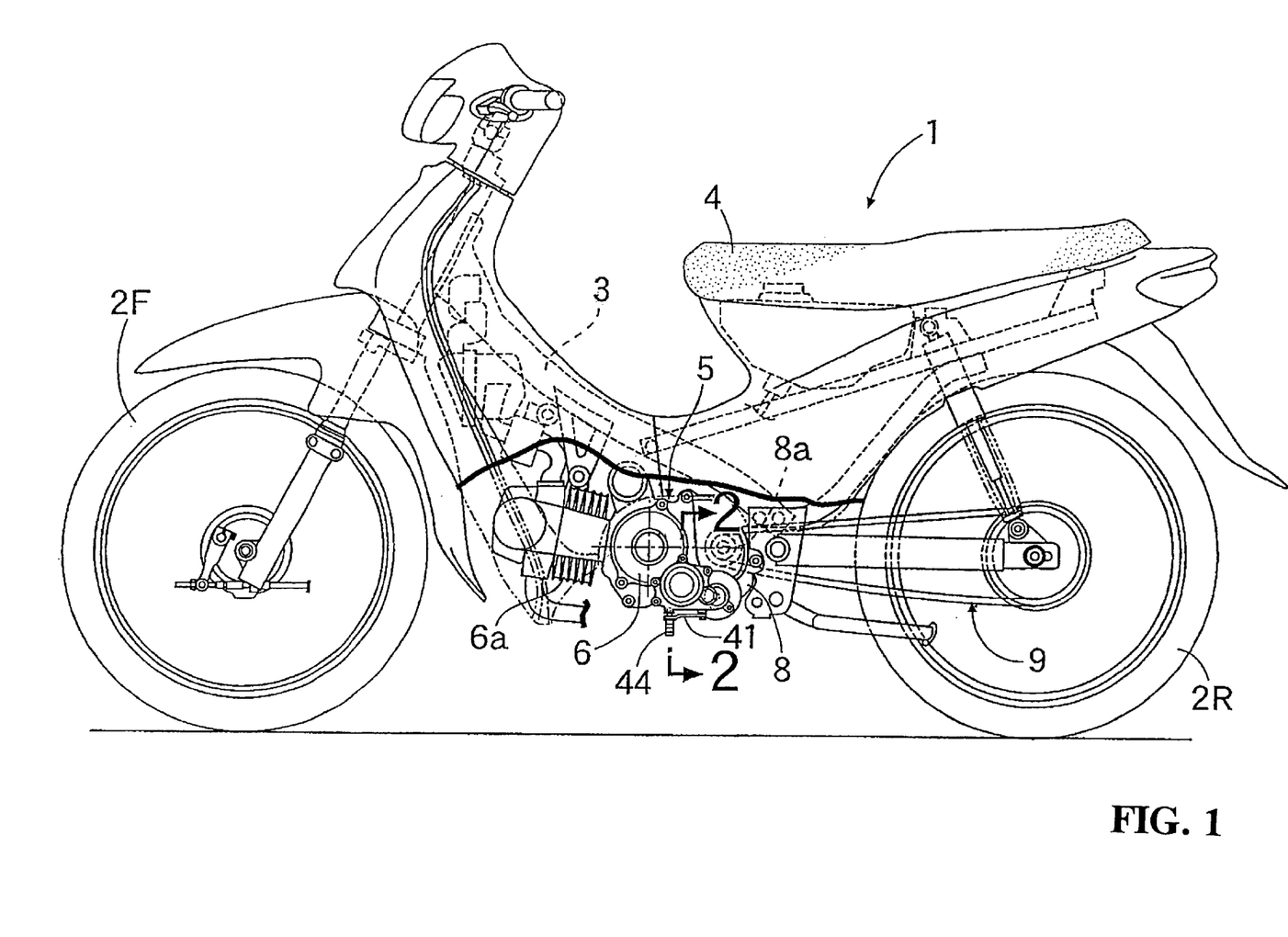
FIG. 1 is a side view of a motorcycle provided with a change device of a transmission according to the present invention.

As shown in FIG. 1, in a motorcycle 1, between a front wheel 2F and a rear wheel 2R, a saddle 4 is mounted on an upper portion of a body frame 3 and a power unit 5 is mounted on a lower portion of the body frame 3. The power unit 5 is constituted by integrally combining an engine 6 having a cylinder block 6a inclined toward a frontward portion of the motorcycle 1 and a transmission 8 which includes an output shaft 8a protruding from one side thereo.f Power transmitted from the engine 6 to the transmission 8 is transmitted from the output shaft 8a to the rear wheel 2R by way of a chain power transmission device 9.

Figure 2:
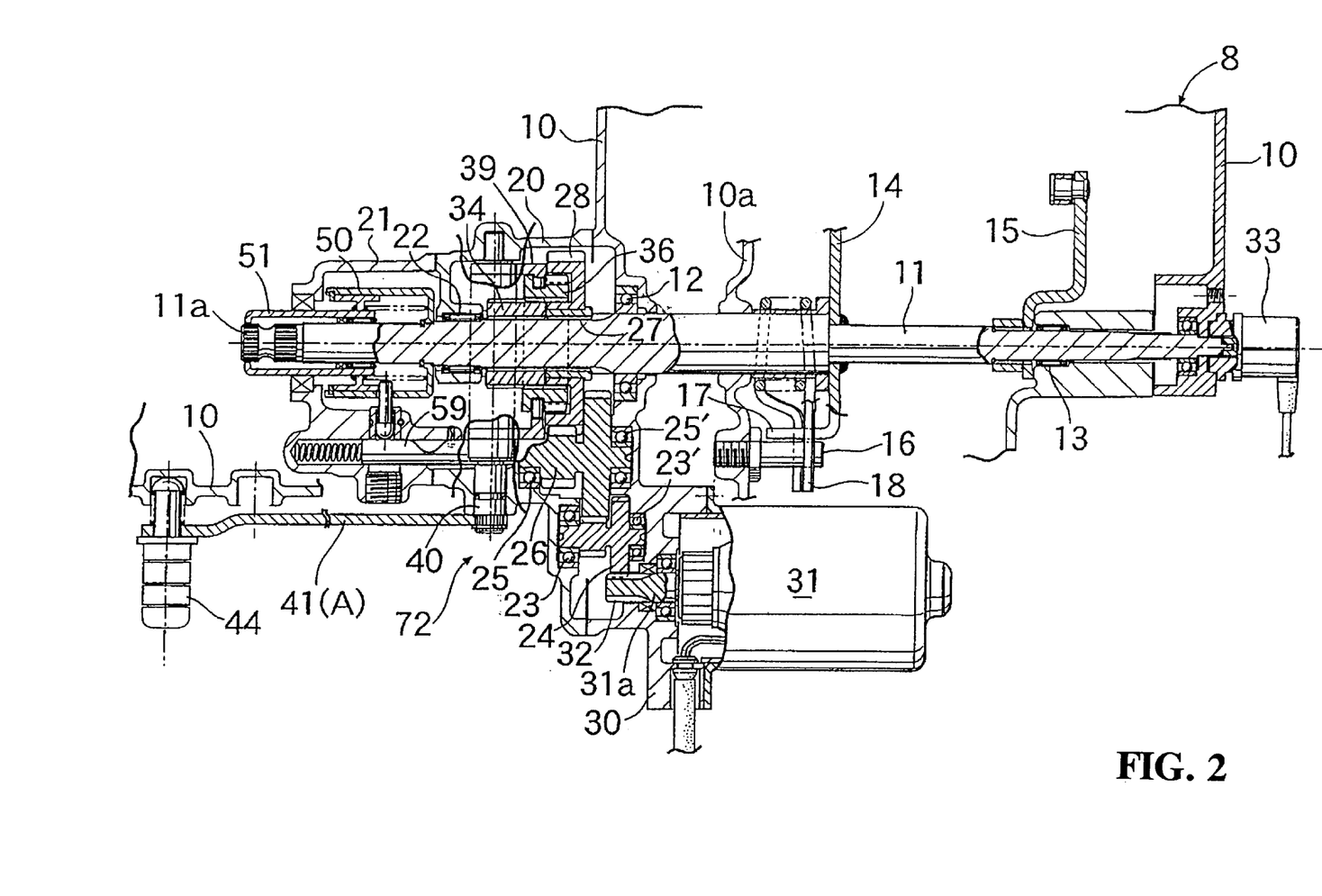
FIG. 2 is a cross-sectional view of FIG. 1 taken along a line 2—2.

As shown in FIG. 2, in the transmission 8, a change spindle 11 which extends in the left and right directions is rotatably supported by left and right walls of a transmission case 10 by bearings 12, 13. Between both bearings 12, 13, a change arm 14 is welded to the change spindle 11 and a clutch arm 15 is engaged with the change spindle 11 by serration. In this manner, the change arm 14 and the clutch arm 15 are fixedly secured to the change spindle 11.

In the transmission case 10, an intermediate wall 10a which is integrally formed with the transmission case 10 is disposed. On both opposing surfaces of the intermediate wall 10a and the change arm 14, a stationary positioning pin 16 and a movable positioning member 17 which are arranged in the radial direction relative to the change spindle 11 are mounted in a protruding manner. A clamp spring 18 which is made of a torsion coil spring and clamps the positioning pin 16 and the positioning member 17 from both sides is mounted on the change spindle 11. When the movable positioning member 17 is made to be arranged on a radial line formed by the stationary positioning pin 16 and the change spindle 11 due to a clamping force of the clamp spring 18, the change spindle 11 is held at a given initial position. When the change spindle 11 is repeatedly rotated in the normal direction and the reverse direction by a fixed angle from this initial position, the change arm 14 rotates a known shift drum (not shown in the drawing) and shifts transmission gears of the transmission 8 in the accelerating or decelerating direction or a clutch of a transmission system (not shown in the drawings) is interrupted by the clutch arm 15 in advance to the shifting and then the clutch is connected after shifting.

The change spindle 11 has both left and right end portions protruded outwardly from both left and right walls of the transmission case 10. A gear case 20 which covers the left end portion is mounted on an outer side surface of the left side wall of the transmission case 10 in an abutting manner and this gear case 20 also supports the change spindle 11 by way of a bearing 22.

Figure 3:
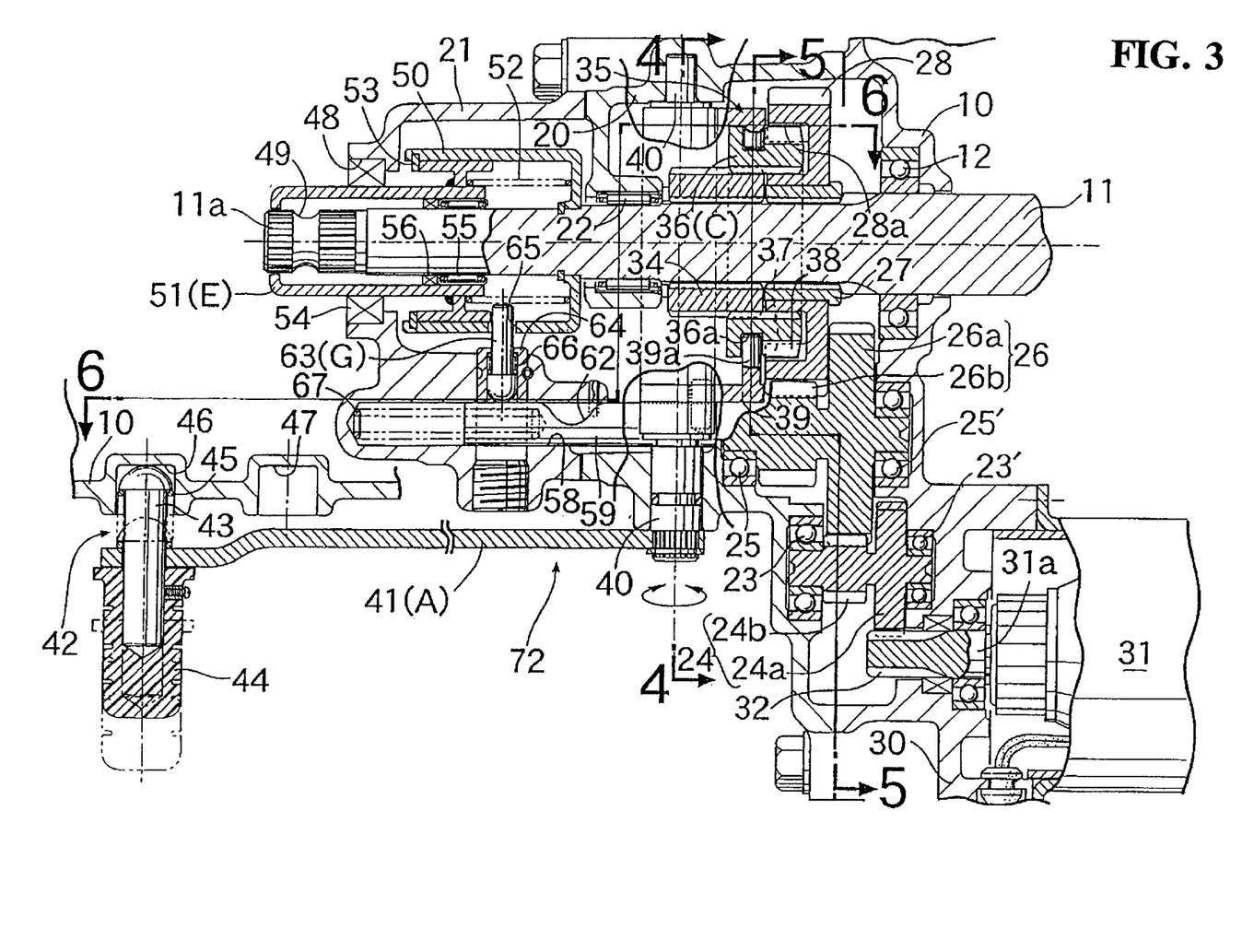
FIG. 3 is an enlarged view of an essential part of FIG. 2 (motor change mode)
Figure 5:
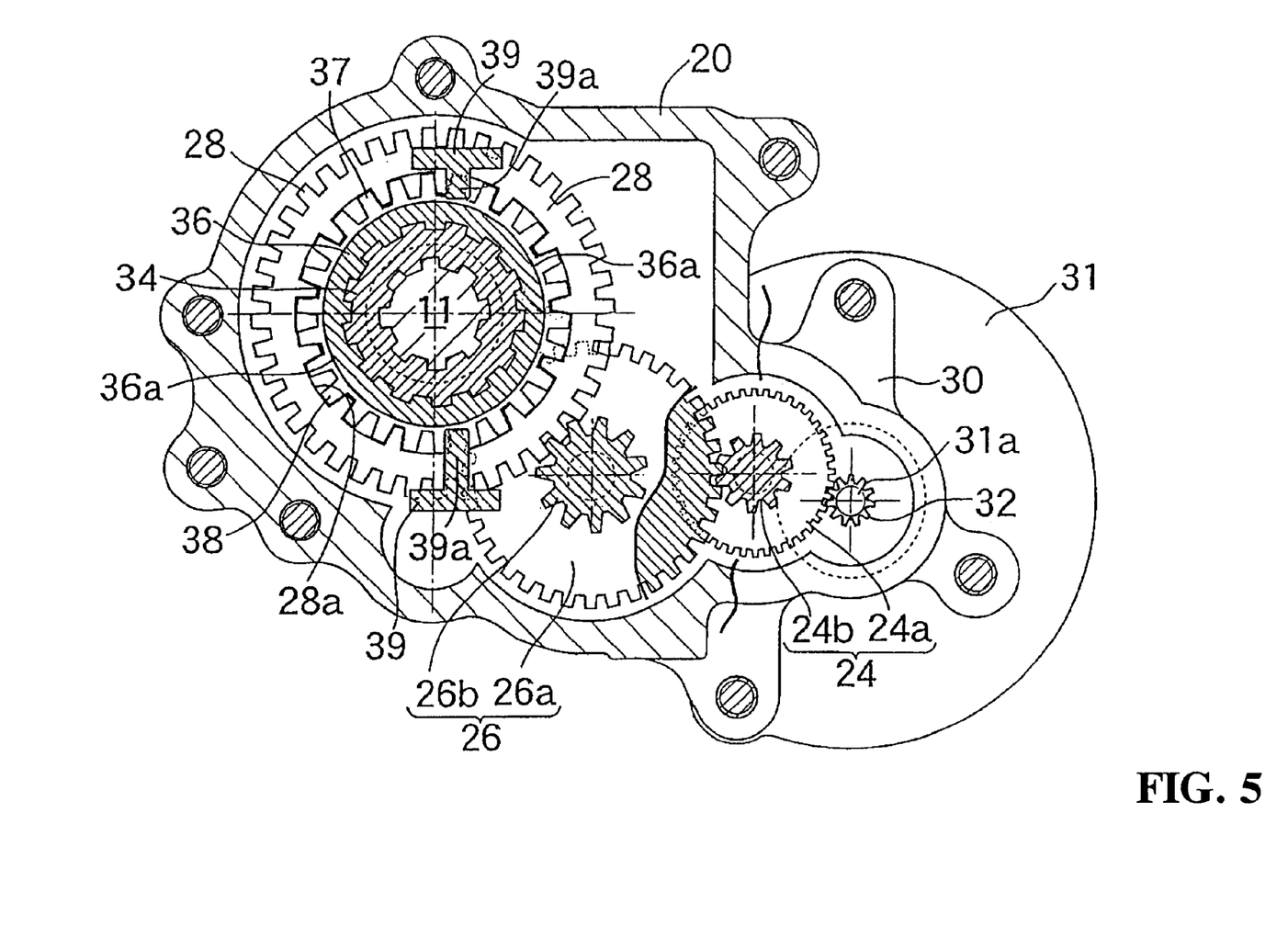
FIG. 5 is a cross-sectional view of FIG. 3 taken along a line 5—5.

As shown in FIG. 3 and FIG. 5, in the gear case 20, a stepped reduction gear 24 is supported by opposing walls of the case 20 and the transmission case 10 by way of bearings 23, 23'. A second reduction gear 26 is supported by opposing walls of the case 20 and the transmission case 10 by way of bearings 25, 25'. A spindle gear 28 is rotatably supported on a sleeve 27 mounted on the change spindle 11 by a spline fitting. A large-diameter gear 26a of the second reduction gear 26 is meshed with a small-diameter gear 24b of the first reduction gear 24 and a spindle gear 28 is meshed with a small-diameter gear 26b of the second reduction gear 26. Further, the sleeve 27 and the spindle gear 28 are supported on the change spindle 11 such that they are not movable in the axial direction.

Further, on the left side wall of the transmission case 10, a motor mounting portion 30 which protrudes in the radially outward direction from the change spindle 11 is integrally formed and a change motor 31 is mounted on a side surface of the motor mounting portion 30. A pinion 32 mounted on a rotor shaft 3 1a of the change motor 31 is meshed with a large-diameter gear 24a of the first reduction gear 24. Accordingly, the rotation of the rotor shaft 31a is reduced from the pinion 32 to the spindle gear 28 in three stages.

A change gear position sensor 33 which detects a change gear position of the transmission 8 based on the rotational history of the change spindle 11 is connected to a right end of the change spindle 11. This change motor 31 is automatically operated in response to an output signal of this change gear position sensor 33, an engine rotational speed sensor, a throttle sensor, a motorcycle speed sensor (none of them shown in the drawing) or is operated by a manual operation of an acceleration/deceleration switch.

A spline collar 34 is fitted into the gear case 20 by a spline fitting adjacent to the spindle gear 28 such that the spline collar 34 is not movable in the axial direction. In the spindle gear 28, an annular recessed portion 28a (see FIG. 8) which opens toward the spline collar 34 side is formed and a clutch inner teeth 37 is formed in an inner peripheral surface of the recessed portion 28a. On an outer peripheral surface of the spline collar 34, a clutch gear 36 which has clutch outer teeth 38 on an outer periphery thereof is slidably mounted by a spline fitting. The clutch gear 36 is movable between a clutch ON position C where the clutch outer teeth 38 is engaged with the clutch inner teeth 37 and a clutch OFF position where the clutch outer teeth 38 is disengaged from the clutch inner teeth 37. Clutch means 35 of the present invention is constituted of the clutch gear 36, clutch outer teeth 38 and clutch inner teeth 37.

Figure 4:
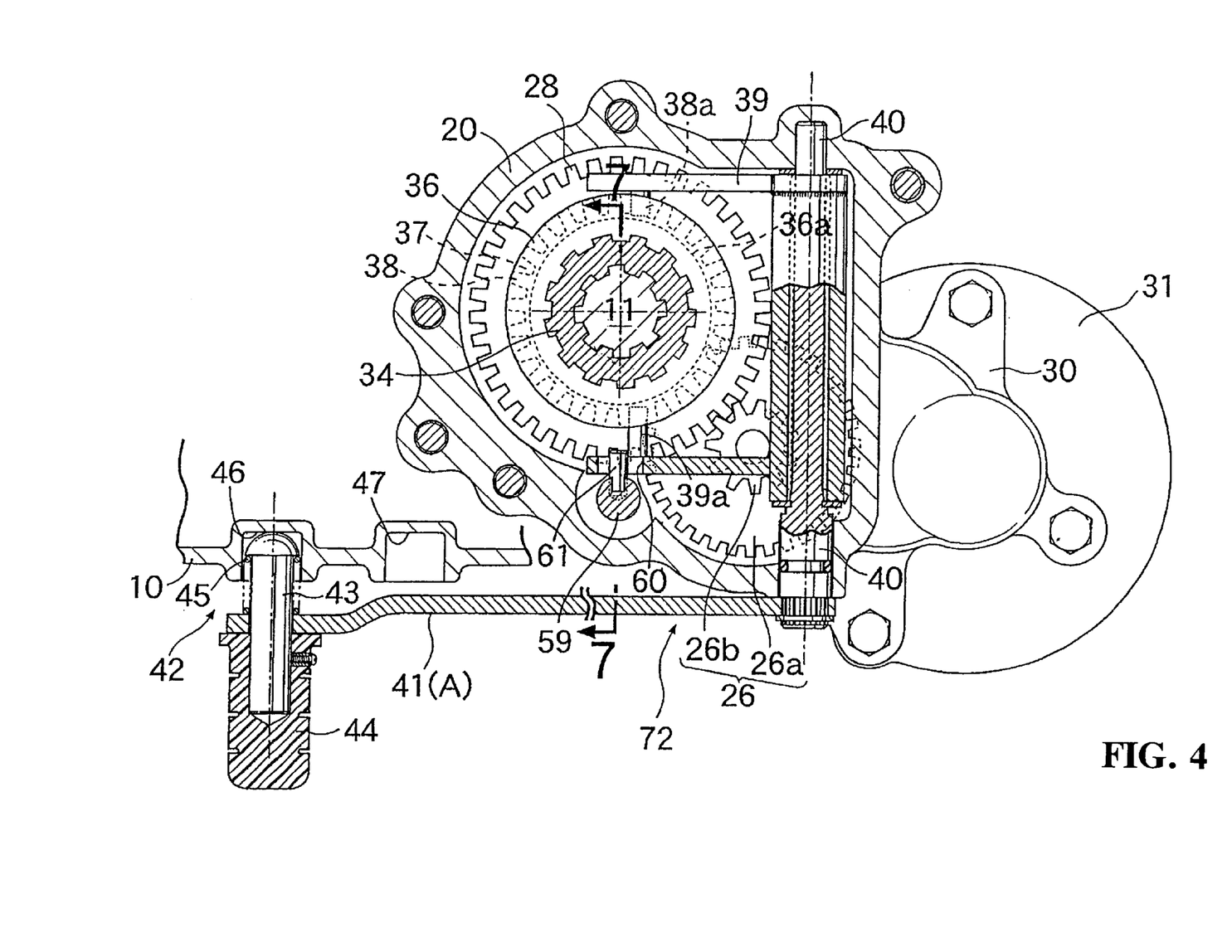
FIG. 4 is a cross-sectional view of FIG. 3 taken along a line 4—4.
Figure 6:
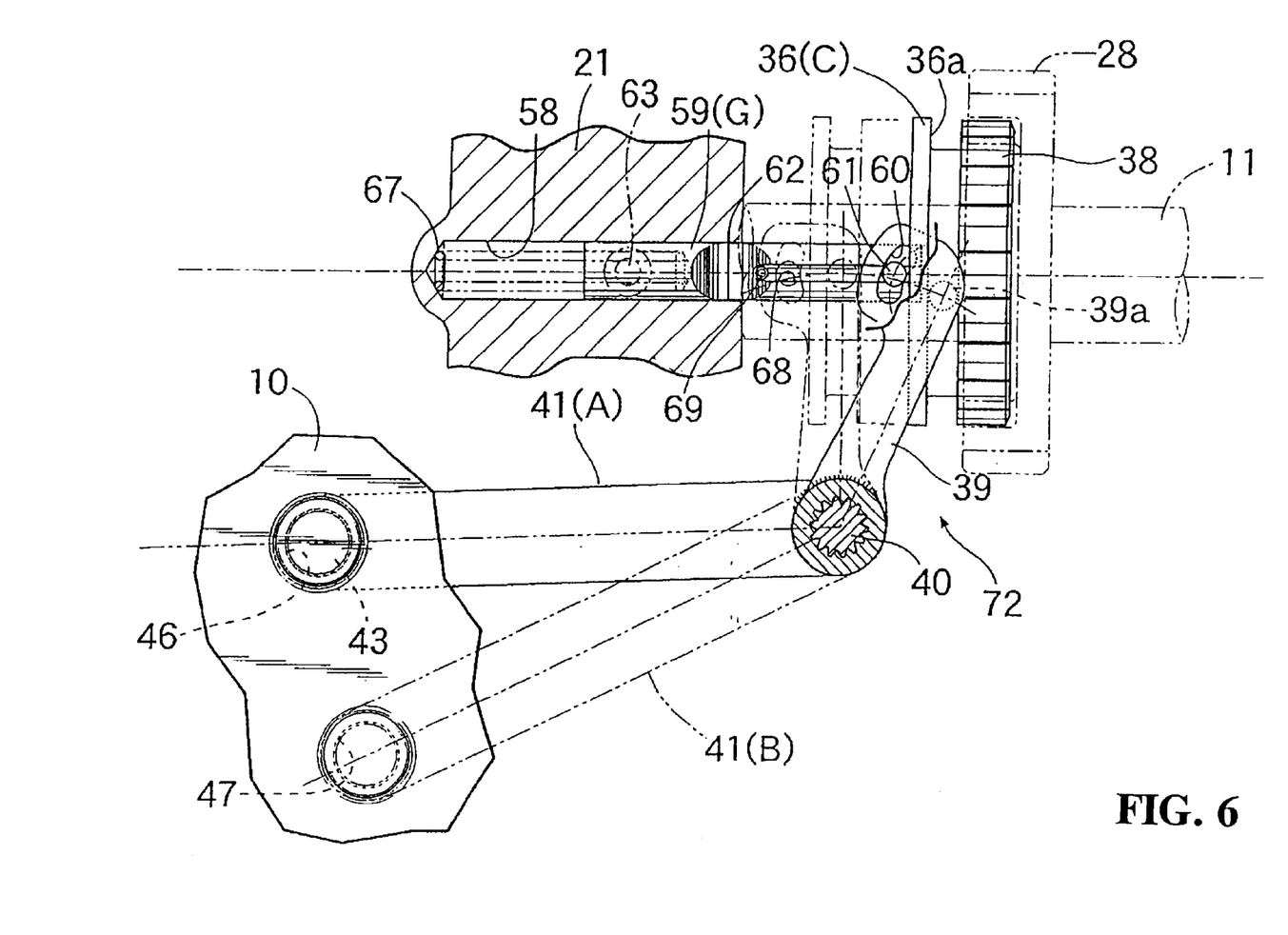
FIG. 6 is a cross-sectional view of FIG. 3 taken along a line 6—6.

As shown in FIGS. 3, 4 and 6, a support shaft 40 which is connected to a proximal portion of a shift fork 39 is rotatably supported on the gear case 20 and a connecting protrusion 39a formed on a tip of the shift fork 39 is engaged with an annular groove 36a formed on an outer periphery of the clutch gear 36. One end of the support shaft 40 passes through a bottom wall of the gear case 20 and is protrudes downwardly from the bottom wall and a mode changeover lever 41 is connected to an end portion of the support shaft 40 by a serration. Accordingly, the mode changeover lever 41 is arranged at the lowermost portion of the power unit 5.

This mode changeover lever 41 is pivotable about an axis of the support shaft 40 between a motor change mode position A and a manual change mode position B. Corresponding to such rotating positions A, B, the shift fork 39 shifts the clutch gear 36 to the clutch ON position C or the clutch OFF position D. A lever lock device 42 which can lock the mode changeover lever 41 at both of the motor change mode position A and the manual change mode position B is provided between the mode changeover lever 41 and the gear case 20.

This lever lock device 42 is constituted by a lock pin 43 which is mounted on a tip of the mode changeover lever 41 and moves back and forth toward a lower surface of the gear case 20. A knob 44 is fixedly secured to a lower end of the lock pin 43. A lock spring 45 is disposed in a compressed form between the lock pin 43 and the mode changeover lever 41 and biases the lock pin 43 toward the gear case 20 side. A first and second lock recessed portions 46, 47 (see FIG. 6) are provided into which an upper end portion of the lock pin 43 is capable of being fitted when the mode changeover lever 41 reaches the motor change mode position A or the manual change mode position B.

To an outer end of the gear case 20, an extension case 21 which further covers the change spindle 11 is mounted in an abutting manner. The change spindle 11 has a serration connecting portion 11a which is formed on a left end portion thereof protruding outwardly through an opening portion 48 formed on an end wall of the extension case 21. An annular groove 49 is formed in an outer periphery of the serration connecting portion 11a.

In the extension case 21, a bottomed cylindrical guide sleeve 50 is mounted on the change spindle 11 such that the sleeve 50 is rotatable relative to the change spindle 11. A connection constraining cover 51 is slidably fitted into the guide sleeve 50. The connection constraining cover 51 is movable between a constraint position E (see FIG. 2) where the connection constraining cover 51 covers the serration connecting portion 11a of the change spindle 11 and an unconstraint position F (see FIG. 7) where the connection constraining cover 51 exposes the serration connecting portion 11a (see FIG. 8). A constraining spring 52 which biases the connection constraining cover 51 toward the constraint position E is accommodated in the guide sleeve 50. The constraint position E of the connecting constraining cover 51 is defined by bringing the cover 51 into contact with a stopper ring 53 fixedly mounted on an inner periphery of an open end portion of the guide sleeve 50. The unconstraint position F is defined by bringing the cover 51 into contact with an end wall of the guide sleeve 50. In an opening portion 48 of the extension case 21, a seal member 54 is mounted that hermetically comes into contact with an outer peripheral surface of the connection constraining cover 51. Further, a bearing 55 and a seal member 56 are interposed between the connection constraining cover 51 and the change spindle 11.

Figure 7:
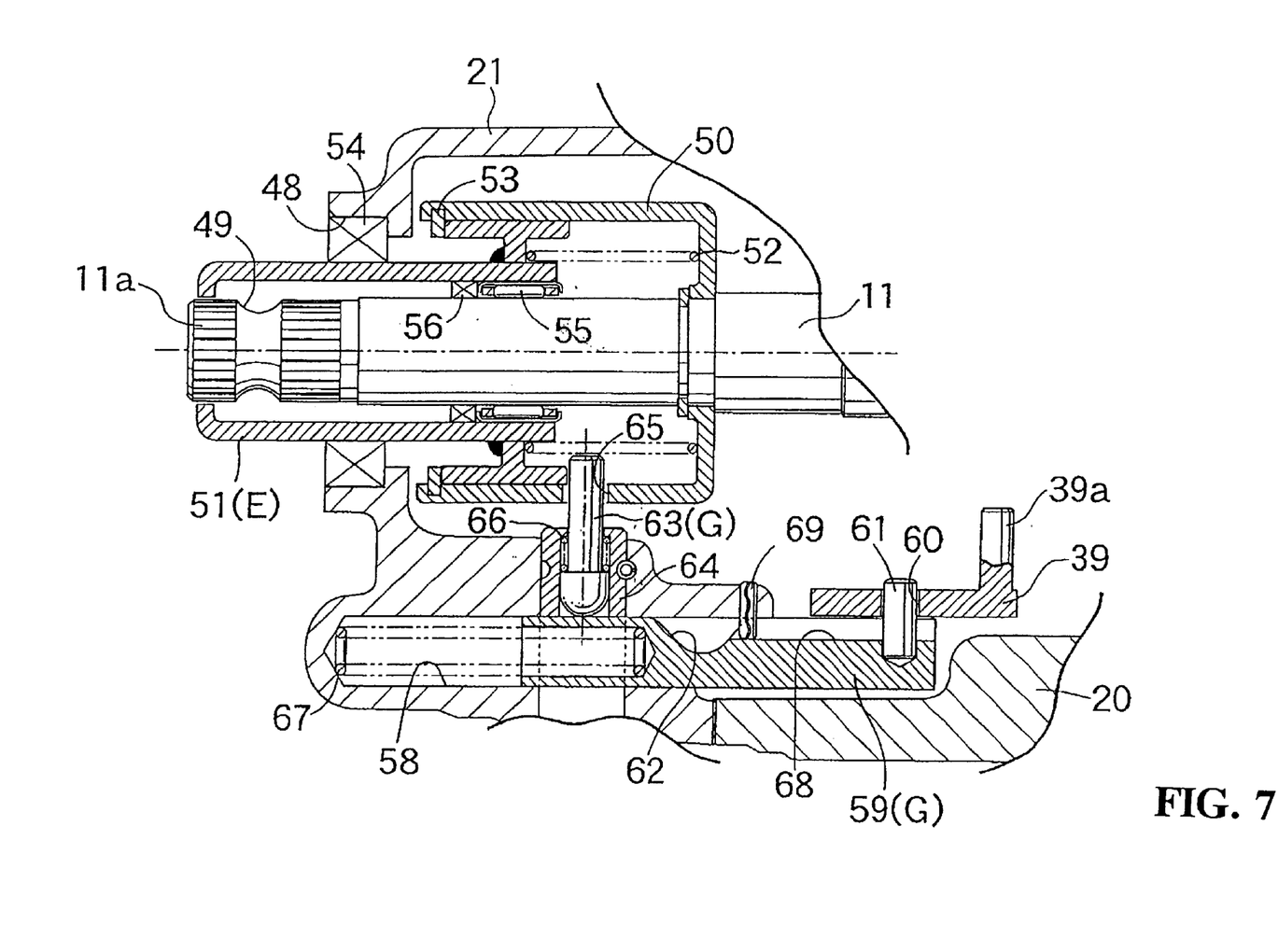
FIG. 7 is a cross-sectional view of FIG. 4 taken along a line 7—7.

As shown in FIGS. 6 and 7, in the extension case 21, a guide hole 58 is formed that extends parallel to the change spindle 11. A sliding rod 59 which is operably interlocked with the shift fork 39 is slidably fitted into the guide hole 58. An elongated hole 60 is formed in a tip of the shift fork 39 and a connecting pin 61 which is engaged with the elongated hole 60 is fixedly mounted on the sliding rod 59. Due to such a constitution, interlocked with the pivoting of the mode changeover lever 41 to the motor change mode position A or the manual change mode position B, the sliding rod 59 is made to be shifted to a lock position G (see FIG. 7) or an unlock position H (see FIG. 8).

A spring 67 which biases the sliding rod 59 toward the motor change mode position A side of the mode changeover lever 41 is accommodated in the guide hole 58.

The sliding rod 59 is provided with a cam recessed portion 62 on one side of an intermediate portion thereof and a lock pin 63 is engaged with the cam recessed portion 62. This lock pin 63 is sidably fitted into a guide sleeve 64 of the extension case 21 and a tip portion of the lock pin 63 is always fitted into a guide hole 65 formed in the guide sleeve 50. When the sliding rod 59 occupies the lock position G, the lock pin 63 is pushed out of the cam recessed portion 62 and hence, the tip of the lock pin 63 protrudes into the inside of the guide sleeve 50 and is engaged with a rear end (a right end in FIG. 7) of the connection constraining cover 51 at the constraint position E to lock the connection constraining cover 51 at the constraint position E. Further, when the sliding rod 59 occupies the unlock position H, the lock pin 63 is received by the cam recessed portion 62 so as to release the connection constraining cover 51.

The lock pin 63 is always biased toward the cam recessed portion 62 side due to a biasing force of an unlock spring 66. Accordingly, when the sliding rod 59 reaches the unlock position H, the lock pin 63 is automatically received by the cam recessed portion 62 due to the biasing force of the unlock spring 66.

To prevent the rotation of the sliding rod 59 while allowing the slide movement of the sliding rod 59, a key groove 68 which extends in the axial direction is formed in one side surface of the sliding rod 59 and a key 69 fixedly secured to the extension case 21 is slidably engaged with the key groove 68.

In a tool bag mounted on the motorcycle 1, a change pedal 70 (see FIG. 8) which is connectable with the serration connecting portion 11a of the change spindle 11 is prepared. This change pedal 70 is provided with a serration boss 70a which can be fitted on the serration connecting portion 11a. The boss portion 70a is provided with a set screw 71 which can be fastened to and engaged with an annular groove 49 of the serration connecting portion 11a. Due to such a constitution, the change motor 31 and the change manipulating member 70 are disposed such that they can be connected to the change spindle 11 in parallel.

In the above constitution, the mode changeover means 72 can be constituted of the mode changeover lever 41, the shift fork 39, the clutch gear 36, the sliding rod 59, the rock pin 63 and the connection constraining cover 51.

Subsequently, the manner of operation of this embodiment is explained. In this mode, the change spindle 11 is manipulated by the change motor 31. As shown in FIGS. 3 and 6, the mode changeover lever 41 is set to the motor change mode position A. That is, the lock pin 43 of the mode changeover lever 41 is fitted into the first lock recessed portion 46 due to the biasing force of the lock spring 45. Interlocked with the position of the mode changeover lever 41, the shift fork 39 shifts the clutch gear 36 to the clutch ON position C so as to make the clutch outer teeth 38 engage with the inner teeth 37 of the spindle gear 28 and to move the sliding rod 59 to the lock position G. The connection constraining cover 51 in the guide sleeve 50 usually occupies the constraint position E where the connection constraining cover 51 covers the serration connecting portion 11a of the change spindle 11 by the biasing force of the constraining spring 52. Accordingly, when the sliding rod 59 reaches the lock position G, the lock pin 63 is pushed out from the cam recessed portion 62 of the sliding rod 59 and protrudes into the inside of the guide sleeve 50 such that the lock pin 62 receives the rear end (the right end in FIG. 7) of the connection constraining cover 51. In this manner, the connection constraining cover 51 is locked to the constraint position E.

Here, due to the engagement of the clutch outer teeth 37 and the inner teeth 38, that is, due to the connection of the clutch means 35, the spindle gear 28 is connected to the spline collar 34 which is connected to the change spindle 11 by a spline fitting by way of the clutch gear 36. Accordingly, the rotation of the rotor shaft 31a of the change motor 31 can be transmitted to the change spindle 11 by way of the pinion 32, the first and second reduction gears 24, 26, the spindle gear 28, the spindle gear 28 and the spline collar 34. Therefore, by operating the change motor 31 automatically or manually as mentioned above, the change spindle 11 can be rotated reciprocably in the accelerating direction or decelerating direction thus realizing the gear change.

On the other hand, the connection constraining cover 51 which is locked at the constraint position E by the lock pin 63 keeps covering the serration connecting portion 11a of the change spindle 11 and hence, the mounting of the change pedal 70 to the connecting portion 11a is impossible. Accordingly, a trouble that the change pedal 70 is erroneously mounted on the change spindle 11 and the change motor 31 and the change pedal 70 interfere with each other can be obviated in advance.

Figure 8:
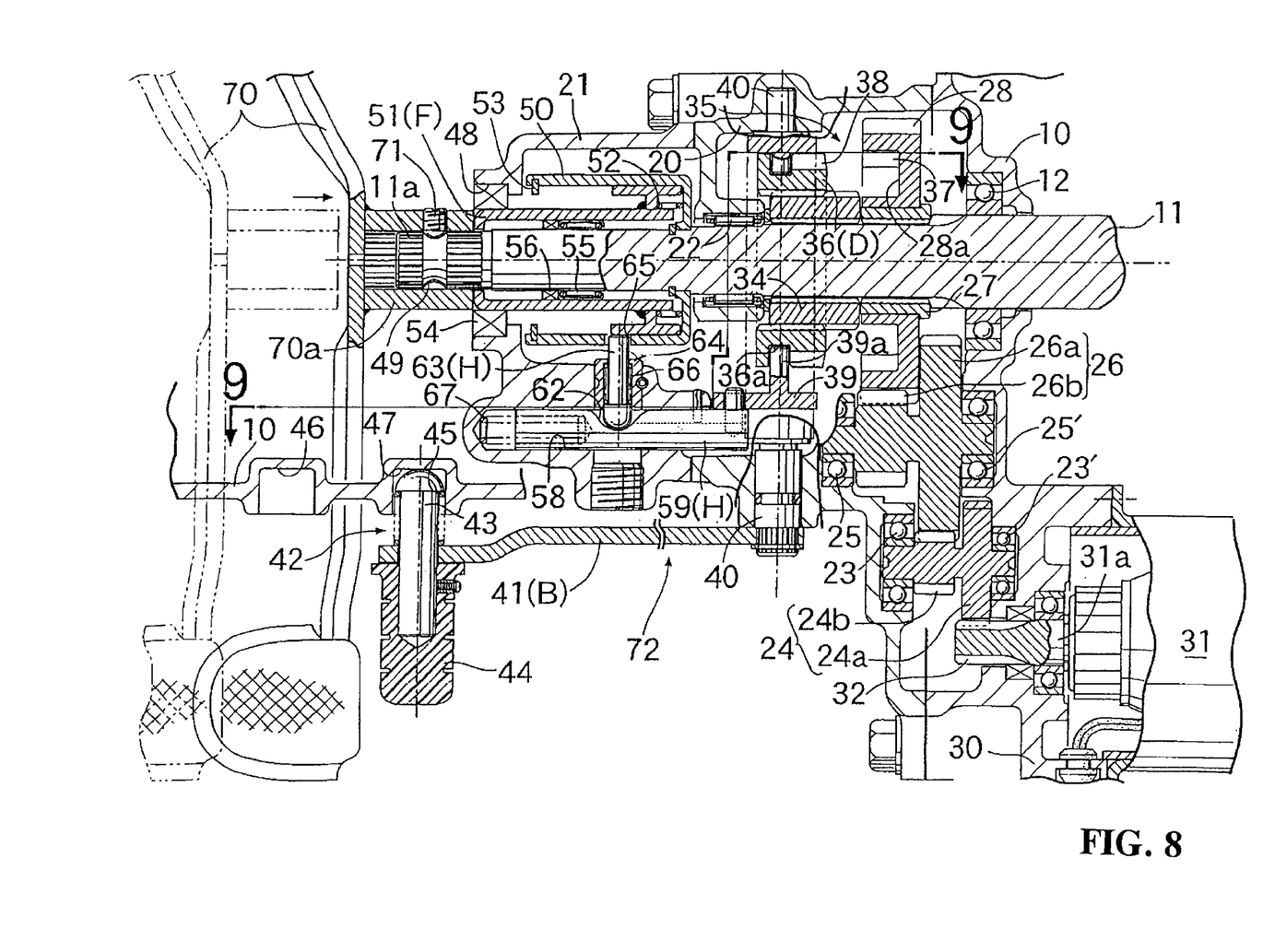
FIG. 8 is a cross-sectional view corresponding to FIG. 3 showing a manual change mode.
Figure 9:
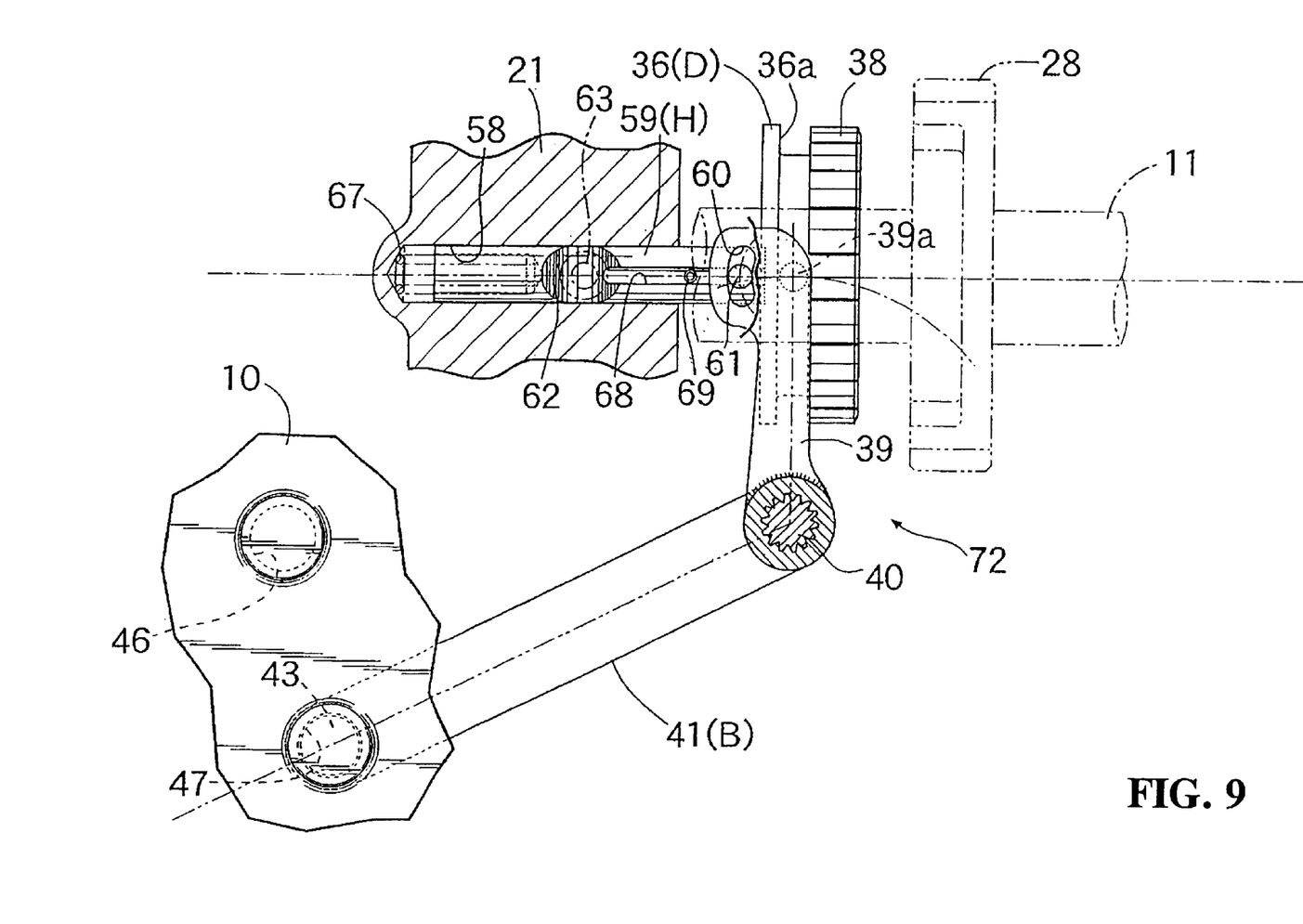
FIG. 9 is a cross-sectional view of FIG. 8 taken along a line 9—9.

This mode manipulates the change spindle 11 with the change pedal 70. To change over the motor change mode to this mode, the knob 44 is pinched and the lock pin 43 is pulled out from the first lock recessed portion 46. Then, as shown in FIG. 8 and FIG. 9, the mode changeover lever 41 is pivoted to the manual change mode position B and the lock pin 43 is fitted into the second lock recessed portion 47 due to the biasing force of the lock spring 45. Interlocked with the position of the mode changeover lever 41, the shift fork 39 shifts the clutch gear 36 to the clutch OFF position D so as to disengage the clutch outer teeth 38 from the inner teeth 37 of the spindle gear 28 (interruption of clutch means 35) and to move the sliding rod 59 to the unlock position H.

Due to the interruption of the clutch means 35, the transmission between the spindle gear 28 and the change spindle 11 is interrupted so that the gear change operation by the change motor 31 becomes impossible.

On the other hand, when the sliding rod 59 reaches the unlock position H, the cam recessed portion 62 faces the lock pin 63 in an opposed manner and hence, the lock pin 63 is retracted to the cam recessed portion 62 due to the biasing force of the unlock spring 66 and releases the connection constraining cover 51. Accordingly, the connection constraining cover 51 is movable from the constraint position E to the unconstraint position F.

Then, as shown in FIG. 8, by pushing the connection constraining cover 51 toward the unconstraint position F side with the boss 70a of the prepared change pedal 70, the boss 70a can be fitted onto the serration connecting portion 11a of the change spindle 11. Subsequently, by fastening the set screw 71 to the annular groove 49 of the serration connecting portion 11a, the change pedal 70 is firmly connected to the change spindle 11.

Accordingly, by a usual step-in manipulation of the change pedal 70, the change spindle 11 is reciprocably rotated so as to perform the gear change.

In this case, since the gear change by the change motor 31 is inoperable, even if the change motor 31 is operated erroneously, the mutual interference between the operation of the change motor 31 and the operation of the change pedal 70 can be obviated in advance.

Further, the connection constraining cover 51 which occupies the constraint part E clogs the guide hole 65 from the inner surface side of the guide sleeve 50 and prevents the lock pin 63 from entering the inside of the guide sleeve 50. Accordingly, under this condition, even if one erroneously tries to pivot the mode changeover lever 41 to the motor change mode position A side, such a pivoting is prevented. Therefore, unless the change pedal 70 is removed from the serration connecting portion 11a so as to return the connection constraining cover 51 to the constraint position E due to the biasing force of the constraining spring 52, it is impossible to perform the mode changeover operation.

As described above, due to the changeover manipulation of the mode changeover lever 41, either the motor change mode or the manual change mode can be selected so that the change mode can be freely changed corresponding to the preference of a driver or the driving condition. Further, when one change mode is selected, other change modes becomes inoperable and hence, the mutual interference between the operation of the change motor 31 and the operation of the change pedal 70 can be obviated in advance so that the change spindle 11 can be always rotated as the driver wishes thus realizing the appropriate gear change.

Further, in case of the motor change mode, the change pedal 70 is forced to be removed from the change spindle 11 and the serration connecting portion 11a of the change spindle 11 is covered by the connection constraining cover 51 so that the appearance can be enhanced.

Further, since the mode changeover lever 41 is disposed at the lower portion of the power unit 5, in the usual riding posture of the driver, the driver cannot manipulate the mode changeover lever 41. Accordingly, this compels the driver to get off the motorcycle at the time of manipulating the changeover lever 41 so that a careless changeover during cruising can be obviated.

Furthermore, in both of the motor change mode position A and the manual change mode position B, unless the lock pin 43 is pulled out from the lock recessed portion 46, 48, that position is maintained so that the uncontrolled movement of the mode changeover lever 41 due to vibration or the like can be prevented.

Further, the seal member 54 mounted on the outer end wall opening portion 48 of the extension case 21 is arranged to be hermetically brought into contact with either an outer peripheral surface of the connection constraining cover 51 or an outer peripheral surface of the boss 70a of the change pedal 70 connected to the serration connecting portion 11a of the change spindle 11 at the constraint position E. Further, a seal member 56 is interposed between the connection constraining cover 51 and the change spindle 11. Accordingly, the intrusion of rain and dust into the extension case 21 and the gear case 20 through the opening portion 48 can be prevented.

The present invention is not limited to the above-mentioned embodiments and various design modifications are possible within a scope without departing from the gist of the present invention. For example, the installation place of the mode changeover switch 41 is not limited to the lower portion of the power unit 5 and may be any place where the driver cannot manipulate the mode changeover lever 41 during cruising.

As has been described heretofore, according to the first feature of the present invention, in a change device of a transmission for a vehicle in which a change motor and a change manipulating member are provided such that they can be connected to a change spindle of a transmission in parallel whereby the change spindle can be operated by either the change motor or the change manipulating member, mode changeover means which is capable of performing a changeover operation between a motor change mode position which provides an operation of the change spindle only by the change motor and a manual change mode position which provides an operation of the change spindle only by the change manipulating member is disposed between the change spindle and the change motor and the change manipulating member. Accordingly, the mode changeover means can be changed over corresponding to the preference of the driver or the driving condition and hence, either the motor change mode or the manual change mode can be freely selected. Further, when one change mode is selected, the other change mode becomes inoperable so that the operational interference between the change motor and the change pedal can be obviated in advance whereby the change spindle is always rotated as the driver wishes thus realizing an appropriate transmission.

According to the second feature of the present invention, the mode changeover means is constituted such that a rotor shaft of the change motor is connected to the change spindle by way of a clutch member, a connecting portion is connectable with the change manipulating member and is provided to one end of the change spindle. A connection constraining member is movable between a constraint position which prevents the connection of the change manipulating member to the connecting portion and a unconstraint position which allows the connection of the change manipulating member to the connecting portion is provided the operation of clutch member and operation of the connection constraining member are interlocked such that when the clutch member is connected, the connection constraining member occupies the constraint position and when the clutch member is interrupted, the connection constraining member is allowed to move to the unconstraint position. Accordingly, when the mode changeover member is shifted to the motor change mode position, the change manipulating member is forced to be removed from the change spindle so that the operation of the change spindle by the change manipulating member becomes inoperable and an appearance is enhanced.

Further, according to the third feature, the mode changeover means is disposed at a place where a driver cannot manipulate the mode changeover means in a driving posture and hence, a careless changeover of the changeover means during cruising can be obviated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A change device for a transmission for a vehicle in which a change motor and a change manipulating member are provided such that said change motor and said change manipulating member can be connected to a change spindle of a transmission device in parallel whereby said change spindle can be operated by either said change motor or said change manipulating member, comprising:

mode changeover means disposed between said change spindle and said change motor, said mode changeover means being capable of performing a changeover operation between a motor change position (A) and a manual change mode position (B), wherein when said mode changeover means is in said motor change mode position (A), an operation of said spindle is provided only by said change motor, and when said mode changeover means is in manual change mode position (B), an operation of said spindle is provided only by said change manipulating member.

2. The change device of a transmission for a vehicle according to claim 1, wherein said mode changeover means includes a rotor shaft of said change motor connected to said change spindle by clutch means, a connecting portion connectable with said change manipulating member is provided to one end of said change spindle, a connection constraining member is movable between a constraint position (E) for preventing the connection of said change manipulating member to said connecting portion and an unconstraint position (F) for allowing the connection of said change manipulating member to said connecting portion, and the operation of clutch means and the operation of said connection constraining member are interlocked wherein when said clutch means is connected, said connection constraining member occupies said constraint position (E) and when the clutch means is interrupted, said connection constraining member is allowed to move to said unconstraint position (F).

3. The change device of a transmission for a vehicle according to claim 1, wherein said mode changeover means is disposed at a place where an operator cannot manipulate said mode changeover means in a driving posture.

4. The change device of a transmission for a vehicle according to claim 2, wherein said mode changeover means is disposed at a place where an operator cannot manipulate said mode changeover means in a driving posture.

5. The change device of a transmission for a vehicle according to claim 2, wherein said mode changeover means is a lever operatively connected to a support shaft engagable with said clutch means and said lever being selectively engagable with said change manipulating member for enabling an operator to switch between said motor change mode position and said manual change mode position.

6. The change device of a transmission for a vehicle according to claim 5, and further including a lock pin for selectively locking the lever at one of the motor change mode position and the manual change mode position.

7. The change device of a transmission for a vehicle according to claim 5, and further including a sliding rod operatively connected to a shift fork, said sliding rod being movable between a locked position and an unlocked position, in said unlocked position said change spindle is in engagement with said manual change mode position.

8. The change device of a transmission for a vehicle according to claim 7, wherein said slide rod includes a recessed portion for receiving a lock pin when said slide rod is in an unlocked position.

9. The change device of a transmission for a vehicle according to claim 7, wherein said slide rod includes a groove for permitting a sliding movement of said slide rod while preventing rotation.

10. The change device of a transmission for a vehicle according to claim 7, wherein a cover encloses a portion of the change spindle when said slide rod is in the locked position.

11. A change device for a transmission for a vehicle comprising:

a change motor for automatically actuating said transmission;

a change manipulating member for manually actuating said transmission;

said change motor and said change manipulating member being operatively connected to a change spindle of a transmission device in parallel whereby said change spindle can be operated by either said change motor or said change manipulating member;

mode changeover means disposed between said change spindle and said change motor and said change manipulating member and capable of performing a changeover operation between a motor change mode position (A) for providing an operation of said change spindle only by said change motor and a manual change mode position (B) for providing an operation of said change spindle only by said change manipulating members;

said mode changeover means includes a rotor shaft of said change motor connected to said change spindle by clutch means;

a connecting portion connectable with said change manipulating member and being provided to one end of said change spindle;

a connection constraining member movable between a constraint position (E) for preventing the connection of said change manipulating member to said connecting portion and an unconstraint position (F) for allowing the connection of said change manipulating member to said connecting portion;

said operation of clutch means and the operation of said connection constraining member being interlocked wherein when said clutch means is connected, said connection constraining member occupies said constraint position (E) and when the clutch means is interrupted, said connection constraining member is allowed to move to said unconstraint position (F).

12. The change device of a transmission for a vehicle according to claim 11, wherein said mode changeover means is disposed at a place where an operator cannot manipulate said mode changeover means in a driving posture.

13. The change device of a transmission for a vehicle according to claim 12, wherein said mode changeover means is a lever operatively connected to a support shaft engagable with said clutch means and said lever being selectively engagable with said change manipulating member for enabling an operator to switch between said motor change mode position and said manual change mode position.

14. The change device of a transmission for a vehicle according to claim 13, and further including a lock pin for selectively locking the lever at one of the motor change mode position and the manual change mode position.

15. The change device of a transmission for a vehicle according to claim 13, and further including a sliding rod operatively connected to a shift fork, said sliding rod being movable between a locked position and an unlocked position, in said unlocked position said change spindle is in engagement with said manual change mode position.

16. The change device of a transmission for a vehicle according to claim 15, wherein said slide rod includes a recessed portion for receiving a lock pin when said slide rod is in an unlocked position.

17. The change device of a transmission for a vehicle according to claim 15, wherein said slide rod includes a groove for permitting a sliding movement of said slide rod while preventing rotation.

18. The change device of a transmission for a vehicle according to claim 15, wherein a cover encloses a portion of the change spindle when said slide rod is in the locked position.

* * * * *